United States Patent [19]

Skoch et al.

[11] 3,866,950

[45] Feb. 18, 1975

[54] MULTI-SIZE ADAPTERS

[75] Inventors: Edward L. Skoch, East Meadow; Sigfried W. Anderson, Westbury; Ronald R. Slogick, East Meadow, all of N.Y.

[73] Assignee: Versatile Industries, Inc., Plainview, N.Y.

[22] Filed: May 21, 1973

[21] Appl. No.: 362,250

[52] U.S. Cl.................. 285/4, 285/158, 285/177, 285/423
[51] Int. Cl............................................. F16l 35/00
[58] Field of Search....... 285/4, 177, 423, 158, 176, 285/424

[56] References Cited
UNITED STATES PATENTS

| 880,302 | 2/1908 | Heinemon | 285/4 |
|---|---|---|---|
| 1,781,985 | 11/1930 | Le Grand | 285/158 X |
| 3,151,894 | 10/1964 | Wilson et al. | 285/158 |
| 3,602,530 | 8/1971 | Elwart | 285/4 |
| 3,731,952 | 5/1973 | Elwart | 285/177 |

FOREIGN PATENTS OR APPLICATIONS 1,307,295  9/1962  France............................ 285/177

Primary Examiner—Dave W. Arola

[57] ABSTRACT

A versatile multi-size adaptor to be connected to a duct in a hot or cold air distribution system and having a box-like air discharge outlet in which an air diffuser can be mounted, and having an air inlet made in stepped sections of different size for enabling the same to be connected to one of several sizes of ducts to suit installation requirements A modified embodiment includes a bellows section between the air outlet and the stepped air inlet that can be axially compressed, or extended, and/or flexed so that the stepped inlet can be connected to a duct disposed at an angle to the outlet.

Both embodiments have a groove in each stepped section to reduce wall thickness and facilitate breaking or cutting away of the section or sections of smaller size than that of the particular duct to be connected to the inlet end of the adapter.

9 Claims, 10 Drawing Figures

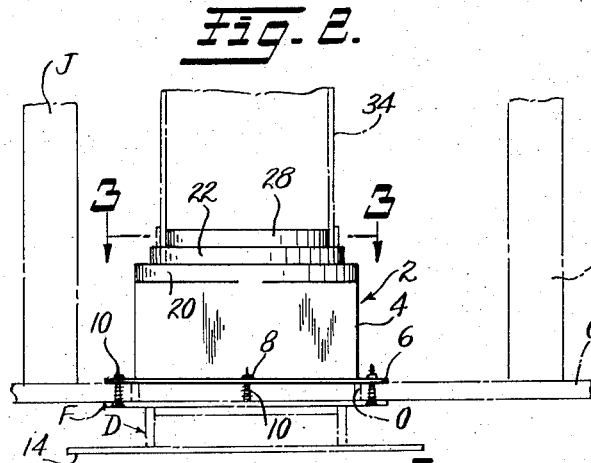
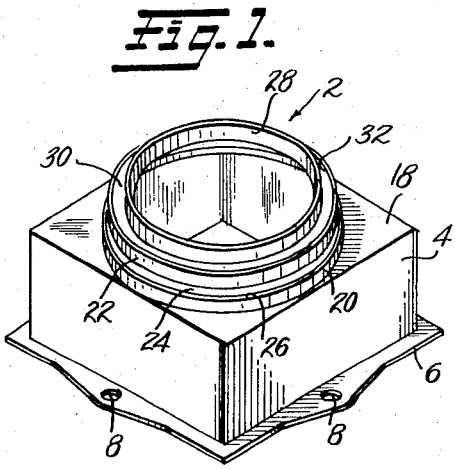
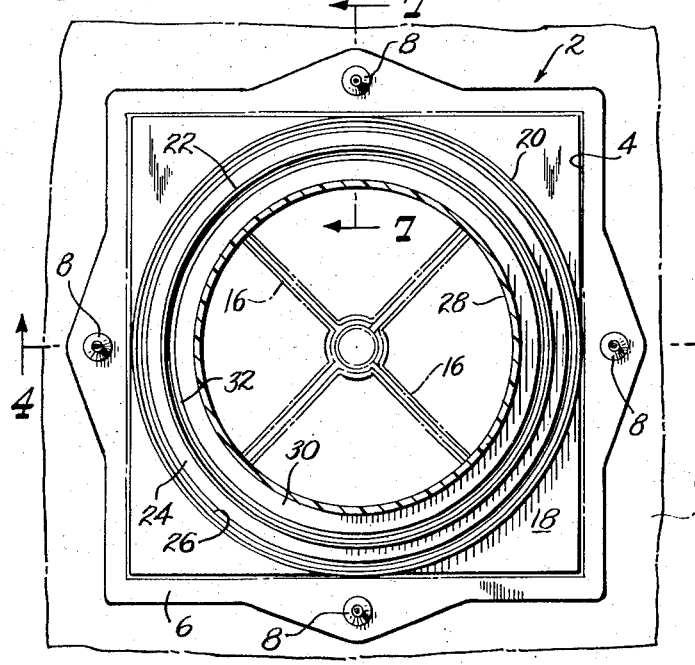
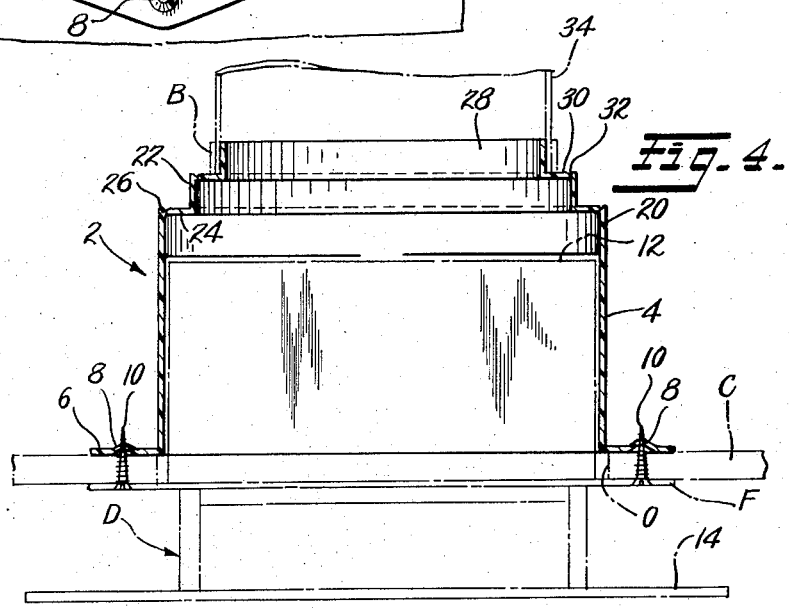

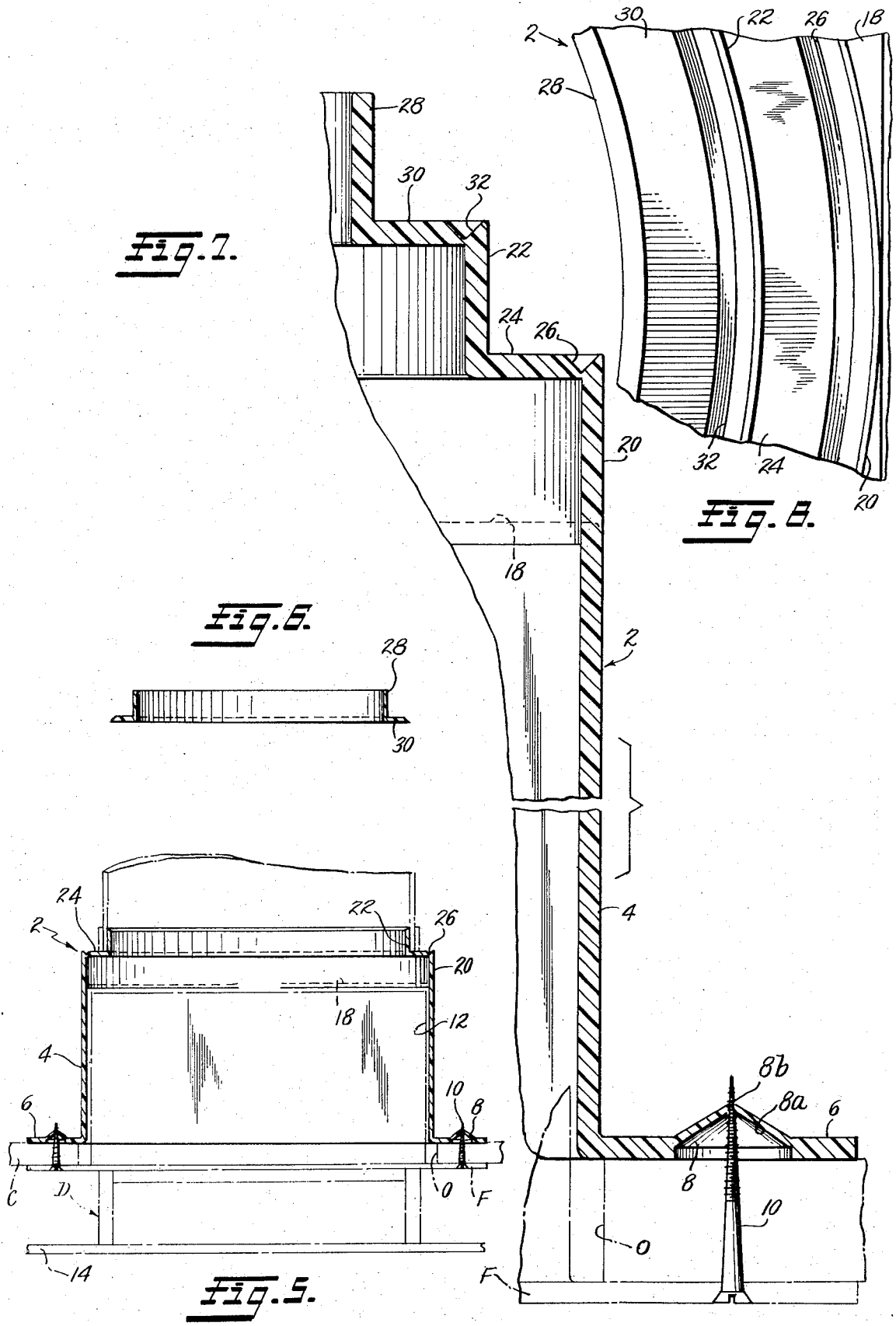

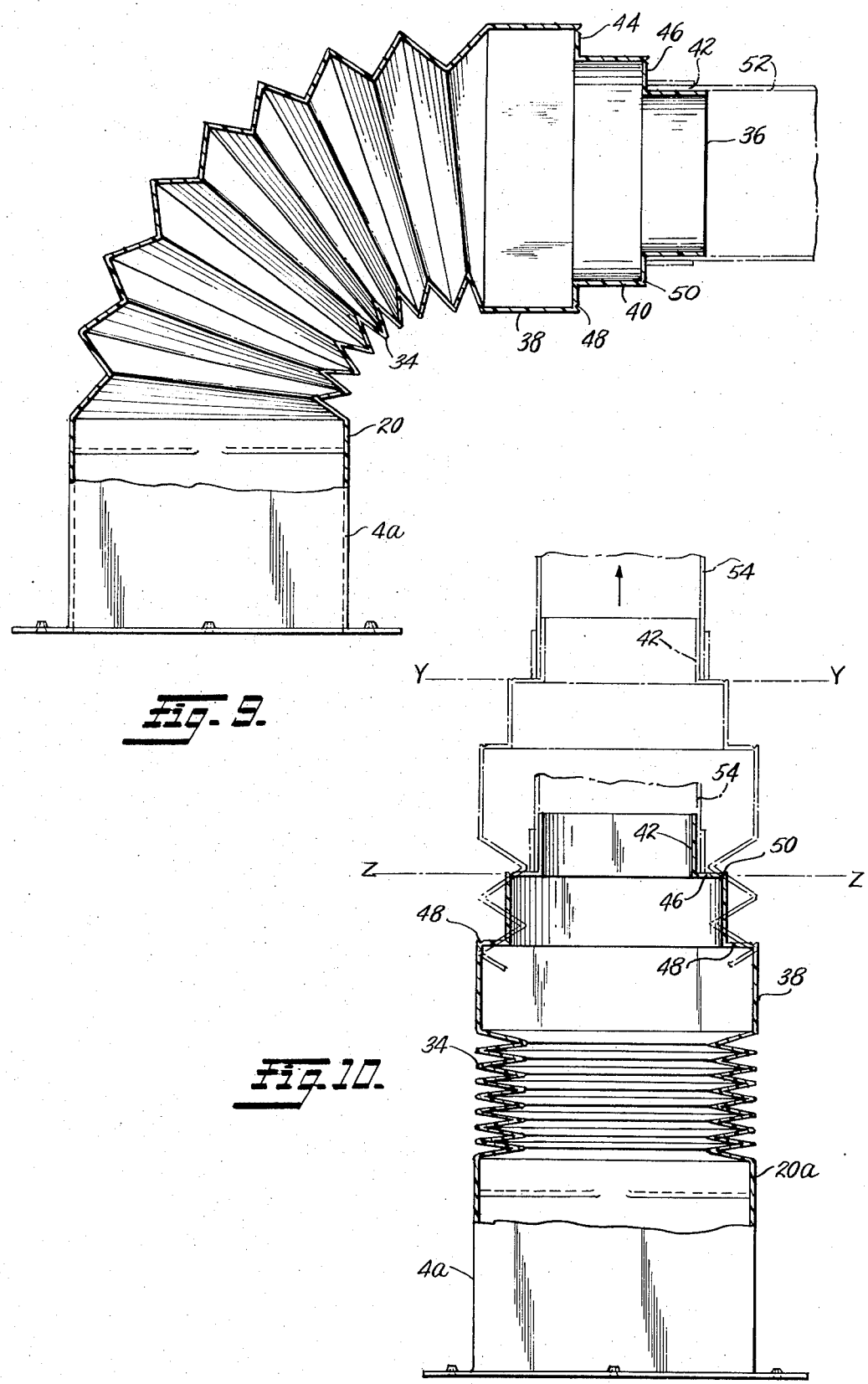

MULTI-SIZE ADAPTERS

BACKGROUND OF THE INVENTION

1. FIELD OF THE INVENTION

The present invention relates to adapters for connection to a duct for distributing hot or cold air in an air heating or air conditioning system, and more particularly to a multi-size connector unit that is designed for connection to ducts of different sizes to meet varying installation conditions.

2. DESCRIPTION OF THE PRIOR ART

Various types of connectors have been provided heretofore for connecting an air distribution duct with an air outlet, but one of the serious problems with such prior connectors is that it is necessary to have a connector of the same size as the air distribution duct, which necessitates providing a separate connector for each size of duct. This means that several sizes of connectors must be carried in stock, one for each size duct. Carrying various size connectors in inventory takes up a great deal of storage space.

Another objection to prior connectors is that it frequently occurs that considerable time is wasted on the job because the installer did not have the correct size connector, or connectors, with him and had to go back to the shop, or to a supplier, to get them.

SUMMARY OF THE INVENTION

The present invention overcomes the foregoing objections in that it provides a multi-size adapters having an air outlet including a chamber designed to receive an air diffuser, and an air inlet that can be connected to any one of several different sizes of air ducts. One embodiment is further designed so that the air inlet can be arranged either in axial alighment with the air outlet, or at an angle thereto.

Both embodiments of the present adapter include a flanged outlet to be mounted in a ceiling or wall opening and a stepped inlet end formed by three sections, preferably cylindrical and of different diameters, connected by an annular wall portion to an adjacent section, and having a groove, preferably at the point of juncture of the annular wall portion and the adjacent cylindrical section, so that the appropriate size of inlet can be selected and the remaining inlet portion readily broken away or severed along the groove.

In a modified form of the invention, a bellows section is disposed between the outlet and the inlet, which can be compressed or extended in an axial direction, or flexed so that the inlet can be disposed at an angle up to 90° or more to the outlet section, thereby eliminating the necessity for separate "stovepipe" elbow sections. Thus, the present adapters are quite versatile.

Accordingly, the principal object of the invention is to provide a multi-size adapter, or connector unit, for use in an air distribution system that can be injection molded of any suitable plastic material and connected to any one of several ducts of different size.

Another object is to provide an adapter of the type described that has an outlet end designed to serve as a receptacle for an air diffuser, and an inlet end designed to enable ducts of different diameters to be selectively connected thereto.

A further object is to provide an adapter of the type described having an inlet end consisting of a plurality of stepped, cylindrical sections of different size to fit different standard size ducts.

Still another object is to provide a multi-size adapter, as described above, including grooves arranged to enable the respective stepped sections to be readily separated from the remainder of the adapter.

A still further object is to provide a multi-size adapter of the type described that has an inlet, and outlet and an intermediate flexible, axially compressible and expansible bellows section designed so that the inlet can be disposed at various distances from and/or at an angle to the outlet.

A more specific object is to provide an adapter having a flange at its outlet for mounting the same in a wall or ceiling, the flange having countersunk, conical recesses with a hole in the bottom for guiding a screw fastener into place, and being designed so that the the tighter the screw is turned, the tighter the bottom wall of the recess will grip the screw.

Other objects and advantages of the invention will be apparent from the following description taken in conjunction with the accompanying drawings.

DESCRIPTION OF THE DRAWINGS

FIG. 1 is a perspective view of one embodiment of the present multi-size adapter.

FIG. 2 is an elevational view showing the adapter, in full lines, mounted above a ceiling between joists, shown in dot-and-dash lines.

FIG. 3 is an enlarged horizontal sectional plan view through the smallest diameter section of the inlet end, taken on the line 3—3 of FIG. 2, and showing, in dot-and-dash lines, an air diffuser mounted in the outlet end of the adapter.

FIG. 4 is a vertical sectional view through the adapter, taken on the line 4—4 of FIG. 3.

FIG. 5 is a vertical sectional view, similar to FIG. 4, but showing the uppermost stepped section of the inlet end removed.

FIG. 6 is a vertical sectional view through the stepped sections removed from the adapter shown in FIG. 5.

FIG. 7 is a greatly enlarged, fragmentary vertical sectional view through the side wall of the adapter, taken on the line 7—7 of FIG. 3, particularly showing the V-shaped grooves that are provided at the juncture of the cylindrical and annular wall portions to permit ready detachment of the section or sections that are smaller than the duct to which the adapter is to be connected.

FIG. 8 is a fragmentary plan view of the side wall section shown in FIG. 7.

FIG. 9 is a view, partly cross-section, of a modified embodiment of the invention, including an intermediate flexible bellows section, and illustrating the manner in which the bellows section permits the inlet end to be disposed at an angle to the outlet end.

FIG. 10 is a similar view, but showing, in full lines, the bellows section partially compressed to shorten the length of the adapter; and showing, in dot-and-dash lines, the manner in which the bellows section can be extended to increase the length of the adapter.

DESCRIPTION OF THE PREFERRED EMBODIMENTS

Referring now to FIGS. 1 to 8 of the drawings, the multisize adapter is generally identified by the numeral 2. It comprises a box-like, square outlet end 4 having a generally square flange 6 at its lower end. The flange 6 has a counter-sunk, conical depression 8, best shown in FIG. 7, with a relatively thin bottom wall 8a and a hole 8b at the apex of the cone. A depression 8 is formed in each of the four sides of the flange, as shown in FIG. 3, and serves as a screw guide when an air diffuser is associated with the outlet, as will appear more fully hereinafter.

The adapter 2 may be mounted between ceiling joists J—J, FIG. 2, above a "sheetrock" ceiling C having an opening O aligned with the adapter outlet 4. An upper element 12, FIG. 4, of an air duffuser D has a flange F that may be secured to the ciling C and to the adapter flange 6 by a screw 10 threaded into the hole 8b in the conical depression 8. The flange F has holes with the same spacing as the depressions 8, so that the conical bottom wall 8a serves to guide the screw 10 into proper alignment with the hole 8b for securing the diffuser in place relative to the outlet 4. The air diffuser D may have the construction shown in the co-pending application of Edward L. Skoch, Ser. No. 131,170, filed Apr. 15, 1971. Accordingly, it is unnecessary for present purposes to describe the air diffuser D in detail and, therefore, a lower element, which is axially adjustable in the upper element 12, is merely further identified by the numeral 14, and the air distributing vanes are identified by the numeral 16, FIG. 3.

The outlet end 4 of the adapter 2 terminates at its upper end in a horizontal transverse wall 18 having a cylindrical wall section 20 extending axially upwardly therefrom. The section 20 may have an outside diameter, for example, of 8 inches. Another cylindrical wall section 22 is disposed in a plane above the cylindrical section 20 and may have an outside diameter, for example, of 7 inches. The cylindrical wall sections 20 and 22 are connected together by a horizontal annular transverse wall portion 24. A generally V-shaped groove 26 is formed at the juncture of the cylindrical wall 20 and the annular transverse wall portion 24. A third cylindrical wall section 28 is disposed in a plane above the wall section 22 and may have an outside diameter, for example, of 6 inches. The cylindrical section 28 is connected with the cylindrical section 22 by an annular transverse wall 30. A V-shaped groove 32 is located at the juncture of the cylindrical wall 22 and the annular transverse wall 30. It will be noted that the bottom of the grooves 26 and 32 is substantially vertically aligned with the inner surface of the cylindrical sections 20 and 22, which makes it easy to cut out an unneeded section or sections.

It will be understood that the cylindrical walls 20, 22 and 28 render the adapter 2 capable of being connected to any one of ducts, for example, 6 inches, 7 inches or 8 inches in diameter. In FIG. 4, a duct 34 is shown connected by a band B to the smallest cylindrical section 28, corresponding to a 6-inch duct. However, it is to be understood that the cylindrical wall portions may be made of any desired diameter and that any number thereof can be provided. Also, that a configuration other than cylindrical may be given to the wall sections 20, 22 and 28.

If a 7-inch duct is to be connected to the cylindrical section 22, as illustrated in FIG. 5, then the cylindrical section 28 and annular wall portion 30 are severed or separated at the V groove 32, since they would not be needed when a 7-inch duct connection is made. FIG. 6 illustrates the cylindrical section 28 and annular wall portion 30 after separation from the cylindrical section 22. It will be understood, of course, that if the outlet 4 is to be connected with an 8-inch duct, then the cylindrical section 22 and the annular wall portion 24 would be but or broken away along the groove 26.

FIGS. 9 and 10 illustrate a modification of the invention wherein a flexible, corrugated, or bellows-like section, 34 comprising a series of interconnected convolutions generally v-shaped in radial cross-section is connected to the upper end of a cylindrical section 20a, adjoining a generally square outlet end 4a, similar to the outlet end 4. An inlet end 36 is connected to the uppermost corrugation of the bellows 34 and comprises a cylindrical secction 38 and two seccessively smaller cylindrical sections 40 and 42 corresponding to the cylindrical sections 20, 22 and 28, respectively, of the adapter 2. The lower end of the cylindrical section 40 is joined to the upper end of the cylindrical section 38 by an annular wall 44, and the lower end of the cylindrical section 42 is joined to the upper end of the cylindrical section 40 by an annular wall 46. Grooves 48 and 50 are provided at the juncture of the annular and cylindrical walls in the same manner. and serve the same purpose as the grooves 26 and 32. As is shown in FIG. 9, the section 42 is connected with a duct 52 disposed at right angles to the outlet 4a. Thus, the intermediate bellows portion 34 enables the adapter to serve the additional function of an elbow. This is another important feature since it eliminates the need for a separate elbow, saves time, expense, and greatly simplifies installation of an air distribution system.

FIG. 10 shows, in full lines, the intermediate bellows portion 34 partially compressed axially, so that the cylindrical section 42 can receive a duct 54 at the level indicated by the line Z—Z, or the bellows 34 can be extended axially, as shown in dot-and-dash lines, so that the cylindrical section 42 can receive the duct 54 at a substantially higher level indicated by the line Y—Y.

It will be understood that the multi-size adapters described and illustrated herein can be made of any suitable, moldable, plastic material and produced by injection molding at relatively low cost. While polyethylene is the preferred plastic material, any other suitable material can be used, for example, polypropylene, polyvinylchloride, ABS, etc. Likewise, it will be understood that the shape, relative proportions and dimensions of the inlet sections of the adapters disclosed herein can be varied within reasonable limits without departing from the principles of the invention or the scope of the annexed claims. Also, that the outlet of the adapter need not be box-like, although such construction is highly advantageous, particularly when a generally square air diffuser is to be installed in the air discharge outlet.

It is claimed:

1. A multi-size connector unit for use in air distribution systems, comprising: an adapter having an outlet end of generally rectangular, box-like configuration to receive an air diffuser, and having an inlet end including at least two axially extending wall sections of different size to fit ducts of corresponding size; a transverse wall connecting the lower end of the smaller section to the upper end of the larger section, said transverse wall having a groove formed therein at its juncture with the wall of said larger section to reduce the thickness of the transverse wall at said juncture to facilitate separation of the smaller section from the larger section by severing along said groove; and a bellows section comprising a series of interconnected convolutions generally V- shaped in radial cross-section disposed between the inlet end and the outlet end of the adapter.

2. A multi-size connector unit, comprising: an adapter having an outlet end and an inlet end, a horizontal wall between said outlet end and said inlet end connecting said outlet and inlet end together, said inlet end including at least two axially extending wall sections of different size, a transverse wall disposed parallel with said horizontal wall and connecting the lower end of the smaller size section to the upper end of the larger size section, said transverse wall having a V-shaped groove formed therein at its juncture with the wall of said larger size section, to reduce the thickness of said transverse wall to facilitate separation of the smaller size section from the larger size section by severing along said groove, the bottom of said V-shaped groove being vertically aligned with the inner face of the wall of the larger size section.

3. A unit as claimed in claim 2 wherein the axially extending wall section are cylindrical and the lower end of the smaller section is connected by an annular wall to the upper end of the larger section.

4. A unit as claimed in claim 2, wherein the inlet end comprises at least three cylindrical sections, each of a different diameter corresponding to a standard size duct, and wherein an annular wall connects the sections in step formation.

5. A unit as claimed in claim 2, wherein the outlet includes a chamber to receive an air diffuser.

6. A unit as claimed in claim 2, wherein the outlet end has an outwardly extending flange, and wherein the flange has a portion shaped to form a projection on one side thereof, said projection having a conical recess for receiving a screw fastener.

7. A unit as claimed in claim 6, wherein the bottom wall of the conical recess is relatively thin compared to the flange and is flexible and has an opening at its apex.

8. A unit as claimed in claim 2, in which a generally cylindrical bellows section comprising a series of interconnected convolutions generally v-shaped in radial cross-section is disposed between the inlet end and the outlet end of the adapter.

9. A unit as claimed in claim 8, in which the bellows section is extensible and contractible axially and is capable of being flexed so that the inlet end can be moved toward or away from the outlet end and/or disposed at an angle to the outlet end.

* * * * *